Nov. 27, 1923.
H. D. NATERMAN
1,475,647
ADJUSTABLE VISOR FOR VEHICLE WINDSHIELDS
Filed Nov. 12, 1921
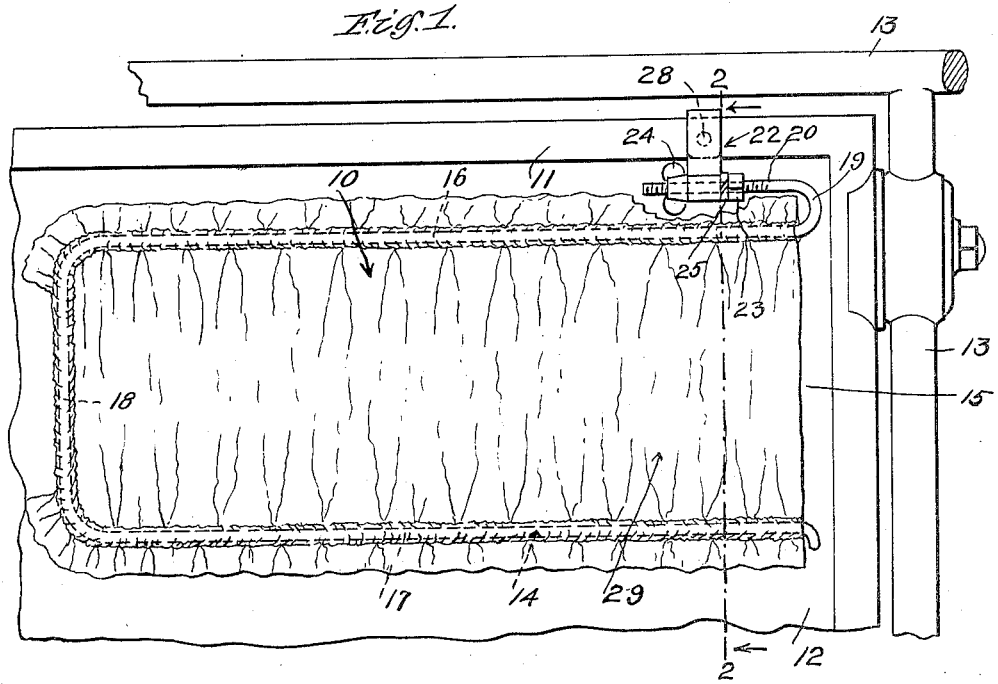
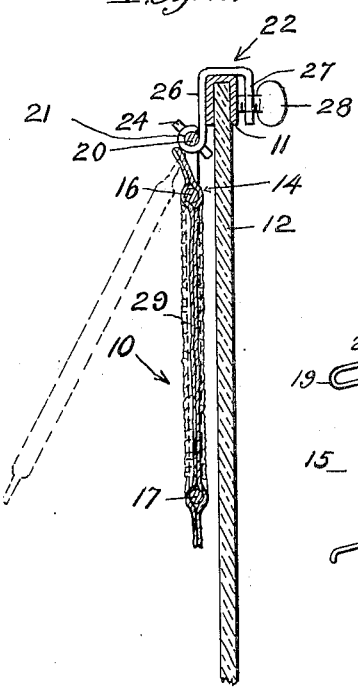
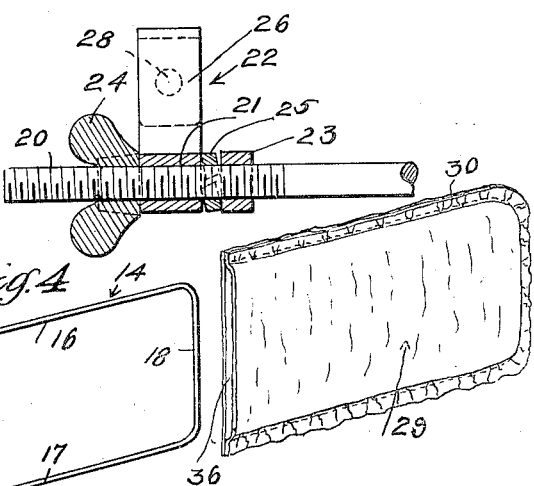
Inventor
Henry D. Naterman.
by
Atty.

Patented Nov. 27, 1923.

1,475,647

UNITED STATES PATENT OFFICE.

HENRY D. NATERMAN, OF LOS ANGELES, CALIFORNIA.

ADJUSTABLE VISOR FOR VEHICLE WINDSHIELDS.

Application filed November 12, 1921. Serial No. 514,601.

*To all whom it may concern:*

Be it known that I, HENRY D. NATERMAN, a citizen of the United States, residing at Los Angeles, in the county of Los Angeles and State of California, have invented new and useful Improvements in Adjustable Visors for Vehicle Windshields, of which the following is a specification.

My invention relates to a light visor adapted for attachment to the wind shields of auto vehicles, and is particularly adapted to be secured adjacent to the upper panel of the wind shield to protect the eyes of the occupants of the front seat thereof from glaring light rays, and the glare from the head lights of approaching vehicles.

The object of my invention is to provide a device of the class above mentioned which will be simple in construction and efficient in operation, and which may be readily attached in position to the vehicle wind shield, as well as capable of being adjusted laterally across the front of the wind shield, at various angles, and automatically held in such adjusted positions to compensate for the changing angle of the sun's rays.

Another object of my invention is to provide a device having a frame composed of a single piece of spring rod or wire forming spring arms between which a suitable screen composed of fabric may be stretched and held in such stretched relation at all times, and which will present an appearance pleasing to the eye.

Other objects of my invention will be more fully disclosed in the following description and illustrated in the accompanying drawings, in which:

Fig. 1 illustrates an inside face view of the upper right hand corner of the vehicle top frame work and wind shield, showing my device attached thereto.

Fig. 2 is a vertical section through the same, taken on the line 2—2 of Fig. 1 viewed in the direction indicated by the arrows.

Fig. 3 is an enlarged detail sectional view illustrating the securing mechanism of my device.

Fig. 4 is a perspective diagrammatic view of the spring frame showing a modified means of attaching or securing the fabric screen thereto.

Referring more particularly to the drawings, 10 designates my device which may be conveniently attached to the transversely disposed rail of the upper panel of the glass wind shield 12, which shield is mounted in the usual manner in the metal supporting frame wire 13 of an auto vehicle. The frame 14 of the visor is preferably formed of a single piece of spring rod or wire bent into a general U shaped form having one of its ends 15 open, the upper or arm portion 16 of the frame lying parallel to and at a distance from the lower portion or arm 17, the two arm portions being connected by an end portion 18 as clearly shown in the drawings.

The end of arm 16 is bent as at 19, and backwardly in parallel relation with said arm, to form the securing end 20, said end being threaded as clearly shown in Figs. 1 and 3 of the drawings. The end 20 is adapted to pass through a bearing 21, formed in a securing clip 22, and threaded on to said end is a jam nut 23 and a butterfly nut 24 adapted to rest adjacent opposite sides of said clip, a spring washer 25 being interposed between one side of said clip and the nut 23 as more clearly shown in Fig. 3 of the drawings.

By the above recited construction it will be seen that the frame 14 will be held in yieldingly frictional engagement with the clip 22, and may be adjusted and held at any desired angle with respect to said clip by merely rocking the end 20 in the bearing 21, the spring washer 25 providing yieldingly frictional engagement between those parts at all times.

The clip 22 is preferably formed of a U shaped piece of strap metal the legs 26 and 27 of which being adapted to straddle the upper rail 11 of the wind shield. Leg 27 is provided with a threaded bore into which a winged headed screw 28 is inserted, and adapted to clamp said clip into any desired longitudinal position along said rail.

A screen member 29 preferably formed of woven silk fabric of a suitable color is secured to the frame 14 and is preferably formed of two pieces which are stitched together on opposite sides of the arms 16 and 17, and connection 18, as more clearly shown in Fig. 2 of the drawings, and is held in stretched relation on said frame by reason of the spring action of arms 16 and 17.

In Fig. 4 of the drawing is illustrated a modified form of attaching the woven silk fabric to the frame 14. By means of this construction it will be noted that the two pieces of fabric are stitched together along the edge by a single row of stitching 30, thus forming a pocket 31 into which may be readily slipped the frame 14, the resiliency of said frame being sufficient to maintain it in a stretched condition at all times.

By the above recited construction it will be obvious that the device is inter-changeable and may be mounted on the wind shield either to the right or left hand side thereof, or two may be used, one being mounted on one side and one on the other side. It may also be noted that the shade may be adjusted longitudinally to any position on the wind shield, and at any desired angle thereon, as shown in dotted lines in Fig. 2 of the drawings, by merely grasping the same and swinging it on its pivotal bearing 21, and as stated before when adjusted at the desired angle it will remain in such adjusted position by reason of the frictional arrangement described.

What I claim is:

1. A wind shield visor, comprising a substantially U shaped frame formed of wire having a fabric curtain stretched between its parallel arms one end of said wire being bent backwardly in parallel relation with the upper of said arms, a clip adapted to be adjustably secured to a vehicle wind shield having a bearing formed therein for the reception of said backwardly bent end, whereby said frame may be rocked in said bearing to an adjusted position, and means whereby said frame may be frictionally engaged with said clip to hold it in said adjusted position.

2. A wind shield visor, comprising a U shaped frame formed of spring wire, a pocketed fabric curtain adapted to be detachably secured to said frame, the resiliency of said frame maintaining said curtain in stretched relation thereon, a clip provided with a bearing adapted to be adjustably secured to the wind shield of a vehicle, and means for frictionally mounting one end of said spring frame in the bearing formed on said clip, whereby the frame may be tilted and held in a plurality of adjusted positions.

In witness that I claim the foregoing I have hereunto subscribed my name this 29th day of October, 1921.

HENRY D. NATERMAN.